(12) United States Patent
 Courtat

(10) Patent No.: US 11,063,739 B2
(45) Date of Patent: Jul. 13, 2021

(54) ADAPTIVE SYNCHRONIZER FOR A DEMODULATION CHAIN

(71) Applicant: Avantix, Aix-en-provence (FR)

(72) Inventor: Thomas Courtat, Paris (FR)

(73) Assignee: AVANTIX, Aix-en-Provence (FR)

( * ) Notice: Subject to any disclaimer, the term of this patent is extended or adjusted under 35 U.S.C. 154(b) by 0 days.

(21) Appl. No.: 16/958,771

(22) PCT Filed: Dec. 22, 2018

(86) PCT No.: PCT/EP2018/086831
§ 371 (c)(1),
(2) Date: Jun. 29, 2020

(87) PCT Pub. No.: WO2019/129760
PCT Pub. Date: Jul. 4, 2019

(65) Prior Publication Data
US 2020/0328871 A1 Oct. 15, 2020

(30) Foreign Application Priority Data
Dec. 29, 2017 (FR) ...................................... 1701419

(51) Int. Cl.
*H04L 27/14* (2006.01)
*H04L 27/16* (2006.01)
(Continued)

(52) U.S. Cl.
CPC .......... *H04L 7/0041* (2013.01); *H04L 7/0062* (2013.01)

(58) Field of Classification Search
CPC ....... H04L 7/0041; H04L 7/0062; H04L 7/00; H04L 27/2647; H04L 27/2675; H04B 1/7085
(Continued)

(56) References Cited

U.S. PATENT DOCUMENTS 5,285,482 A 2/1994 Sehier et al.
6,810,028 B1 * 10/2004 Giallorenzi .......... H04B 1/7085
370/320
(Continued)

FOREIGN PATENT DOCUMENTS

FR 2 685 594 A1 6/1993

OTHER PUBLICATIONS

International Search Report of the International Searching Authority for PCT/EP2018/086831 dated Jul. 19, 2019.

*Primary Examiner* — Phuong Phu
(74) *Attorney, Agent, or Firm* — Arc IP Law, PC; Joseph J. Mayo

(57) ABSTRACT

The present invention relates to an adaptive synchronization device for demodulating a signal in linear modulation (x). The device functions from a sampled version of the signal (x). The device being characterized in that it comprises: —at least one synchronization module (F) comprising: —at least one first sub-module ($F_n$) arranged to deliver a first output signal (y) from the input signal (x) received at a period (T) less than the value (I) with (B) the bandwidth of the input signal (x); this first sub-module ($F_n$) is capable of compensating a transmission delay of the input signal (x) by estimation of the propagation delay ($\tau$) between a transmitter and a receiver of a transmission medium; this first sub-module adapts the rate at its output to one sample per symbol; —at least one second sub-module ($F_u$) arranged to deliver a corrective ($\delta\tau$) to be applied to the current estimation of the delay ($\tau$), from an error term (w) defining the decision error of the device and the influence of the processings downstream of the first sub-module (F); —at least one correction module of transmission imperfections (H), disposed downstream of the synchronization module (F) and forming a correction chain of transmission imperfections of the first output signal (y) received by this module (H) at the rhythm T, and comprising: —at least one first sub-module (Continued)

Figure 1:
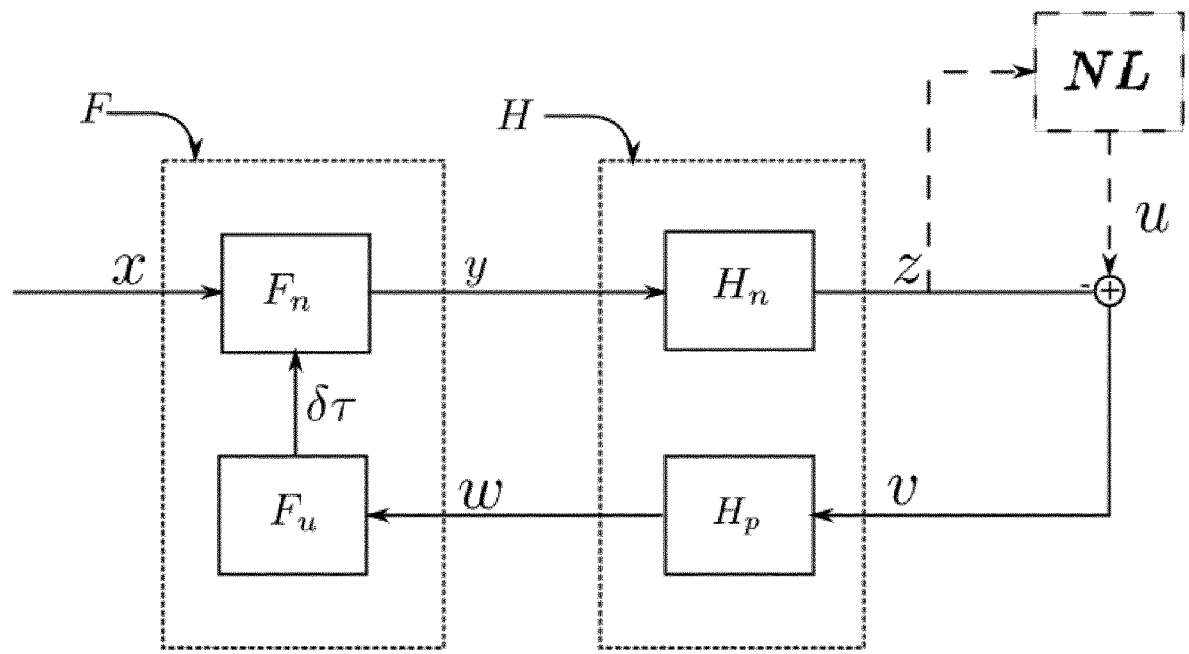

($H_n$) arranged to deliver a second output signal (z) at the rhythm (T) estimating a stream of emitted symbols (ai); —at least one second sub-module ($H_p$) configured to deliver the error term (w), by application of a correction to an error term (v) for estimation of symbols to consider the influence of the processings included in the first sub-module ($H_n$).

$$\left(\frac{1}{B}\right) \qquad (I)$$

18 Claims, 1 Drawing Sheet

(51) Int. Cl.
*H04L 27/22* (2006.01)
*H04L 7/00* (2006.01)

(58) Field of Classification Search
USPC ........ 375/324, 325, 320, 316, 340, 354, 371
See application file for complete search history.

(56) References Cited

U.S. PATENT DOCUMENTS

| | | | |
|---|---|---|---|
| 6,836,518 B1* | 12/2004 | Sano | H04L 27/2675 375/343 |
| 7,298,806 B1 | 11/2007 | Varma et al. | |
| 2002/0039347 A1* | 4/2002 | Matsugatani | H04L 27/2647 370/203 |
| 2016/0080138 A1* | 3/2016 | Biederman | H04L 7/0041 375/354 |
| 2018/0287688 A1* | 10/2018 | Otsu | H04L 7/00 |

* cited by examiner

ADAPTIVE SYNCHRONIZER FOR A DEMODULATION CHAIN

TECHNICAL FIELD OF THE INVENTION

The present invention relates to the field of telecommunications and more particularly an adaptive synchronization device for demodulating a signal to a linear modulation. The present invention also relates to an equipment for demodulating a signal in linear modulation comprising this synchronization device and an adaptive synchronization method for demodulating a signal to a linear modulation performed by this synchronization device.

TECHNOLOGICAL BACKGROUND OF THE INVENTION

In the field of digital telecommunication, demodulation of a signal is performed by a demodulation apparatus to reconstitute a signal called in baseband from observation of a signal modulated and optionally perturbed by the imperfections of a transmission channel. Blind demodulation more particularly enables demodulation of a signal without use of pilot sequences a priori known. A continuous-time signal at input of a receive chain containing a demodulator is especially affected by a time-shift. A synchronization system is used to compensate the time-shift ($\tau$).

In telecommunications, time synchronization is obtained by performing two methods:
- regular emission of pilot sequences and estimation of a time-shift by correlation between an emitted sequence and a received sequence;
- servo controlling of a sampler over a rhythm signal obtained, for example, by the method of the spectral line.

The first process supposes the pilot sequences known and does not apply in general to a blind context. The second process can have the disadvantage of being unstable and not very robust to imperfections of the channel and the transmission chain.

In this context, it is interesting to propose a solution for eliminating the disadvantages of the prior art by optimizing estimation of the synchronization parameter(s).

GENERAL DESCRIPTION OF THE INVENTION

The aim of the present invention is to eliminate some disadvantages of the prior art by proposing a solution to define an adaptive synchronization device, fine and precise on communication channels.

For this purpose, the present invention relates to an adaptive synchronization device for demodulating a signal in linear modulation, the device comprises:
- at least one synchronization module comprising:
  - at least one first sub-module arranged to deliver a first output signal from the input signal received at a period less than the value with the bandwidth of the input signal; this first sub-module is able to compensate a transmission delay of the input signal by estimation of the propagation delay between a transmitter and a receiver of a transmission medium;
  - at least one second sub-module arranged to deliver an instant corrective to be applied to the current estimation of the delay, from an error term defining the decision error of the device and the influence of the processings downstream of the first sub-module;
- at least one correction module of transmission imperfections, disposed downstream of the synchronization module and forming a correction chain of transmission imperfections of the first output signal received by this module at the rhythm, and comprising:
  - at least one first sub-module arranged to deliver a second output signal at the rhythm estimating a stream of emitted symbols, this module able to be reduced to the identity; this first sub-module is configured to adapt the throughput at its output to one sample per symbol;
  - at least one second sub-module configured to deliver the error term, by application of a correction to an error term for estimation of symbols to consider the influence of the processings included in the first sub-module; this module able to be reduced to the identity.

According to another particular feature, the error term for estimation of symbols is obtained by performing a processor and software or an executable code implementing a subtraction operation between a signal at the rhythm estimating trains of the emitted symbols and the second output signal.

According to another particular feature, in a cooperative telecommunication mode, the signal is a suite of known learning sequence, whereas in a non-cooperative telecommunication mode, a non-linear processing is applied to the second output signal to obtain the signal.

According to another particular feature, the input signal sampled by the device verifies the model:

$$x(t)=C\{\Sigma_{i=-\infty}^{+\infty} a_i h(t-iT-\tau)\}+\eta(t) \text{ in which}$$

x(t) is a complex value of the input signal
$a_i$ is a stream or a suite of emitted complex symbols
h is a shaping filter of bandwidth
T is the symbol rhythm; T and B verify $$\frac{1}{T} \leq B$$

$\tau$ is the propagation delay between the transmitter and the receiver
$\eta$ is a term of complex noise
C is a functional modelling the imperfections of the device (channel, dephasing, etc.) which are corrigible by the correction module.

According to another particular feature, the first sub-module of the synchronization module is configured to perform a function: next( ):∅→complex by means of at least one processor and software or executable code, to define the first output signal; and the second sub-module is configured to define a function: update(w):complex→∅ by means of at least one processor and software or executable code, to define the corrective.

According to another particular feature, the first sub-module of the synchronization module comprises a generator configured to extract sample values from the input signal.

According to another particular feature, the sample values extracted from the input signal are transmitted in a first buffer, disposed in the first sub-module of the synchronization module, so as to store the last values of the input signal.

According to another particular feature, the device further comprises a second buffer configured to store auxiliary variables for later calculating the corrective term to be applied to the dates of the samples contained in the first buffer.

According to another particular feature, the first and second buffers are a buffer memory of the FIFO type.

According to another particular feature, the device further comprises an initiation module configured to initialize the parameters of the synchronization module.

According to another particular feature, the synchronization device is initialized by the following initialization operations:

$\vec{t}$=initialize real number vector of size 2n+1 with $\vec{t}[i]=(i-n)\times T_{iq}+\tau$ $\vec{X}$=initialize complex number buffer FIFO of size 2n+1 to 0

$\vec{Y'}$=initialize complex number buffer FIFO of size m to 0 in which the value $T_{iq}$ is the sampling rhythm $\vec{t}$ is the corrected date vector to be reported to 0 an initial value of $\tau \in [0, T[$ an integer n such that the buffers have a size 2n+1 an integer m such that the error is a complex vector of size m

According to another particular feature, the device is configured to perform the following processings by means of at least one processor and software or an executable code:

next( ):∅→complex $\vec{t}=\vec{t}+T$

While $\vec{t}(n)>0$ x=input.next( )

X.append(x)

$\vec{t}=\vec{t}-T_{iq}$ $y=\langle \vec{X}|\vec{h}(\vec{t})\rangle$ $y'=\langle \vec{X}|\vec{h'}(\vec{t})\rangle$ Y'.append(y')

Return y update(w):complex→∅

$\delta\tau=2\mu\cdot\Re(\langle Y'|e\rangle)$ $\vec{t}=\vec{t}+\delta\tau$ in which the values $T_{iq}$ and T are respectively the sampling rhythm and the symbol rhythm h and h' are functions for calculating respectively the shaping filter of the signal and its derivative $\mu \geq 0$ is a real positive or zero parameter called learning speed According to another particular feature, the buffer FIFO can be reinterpreted as a vector whereof the terms of this vector buffer range from the oldest (first index of the vector) to the most recent (last index of the vector) element of the buffer.

According to another particular feature, the device is configured to integrate with other modules intended to correct other defects of the transmission chain.

Another aim of the present invention is to propose an adaptive synchronization device which can be used with a demodulator, in a chain for demodulating signals.

For this purpose, the present invention relates to an equipment for demodulating a signal to a linear modulation, comprising at least one adaptive synchronization device according to any one of the particular features of the present invention, characterized in that the synchronization module is configured to adaptively compensate the propagation delay on all of the input signal received by the receiver equipment, and the second correction module is configured to interface with the synchronization module, disposed upstream of the correction module.

According to another particular feature, a device upstream of the input of the synchronization module samples at a speed greater than the inverse of the bandwidth of the input signal.

Another aim is to rectify one or more disadvantages of the prior art concerning the adaptive synchronization mechanism with decision return for demodulating a signal in linear modulation.

This aim is achieved by an adaptive synchronization method for demodulating a signal to a linear modulation by an adaptive synchronization device with decision return according to any one of the particular features of the present invention, the method being characterized in that it comprises the following steps:

Initialization of parameters of synchronization modules by an initialization module comprising memory buffers;

Receipt of a flow of an input signal by the first sub-module of the first synchronization module;

Delivery of a first output signal sampled at the symbol rhythm and with a corrected delay;

Receipt of the first output signal by the first sub-module of the correction module;

Delivery of a second output signal;

Estimation of the signal of streams of symbols emitted by a non-linear processing and from the second output signal;

Modification of the signal by the estimation of the signal to deliver an estimation error signal of symbols;

Delivery of an error term corrected by the correction module from the estimation error signal of symbols;

Delivery of a corrective term by the second sub-module from the error term;

Rectification and alignment of the propagation delay by applying the corrective term in order to synchronize the input signal with the first output signal by cancelling transmission delay.

Others particular features and advantage of the present invention are detailed in the following description.

DESCRIPTION OF THE ILLUSTRATIVE FIGURES

Figure 2:
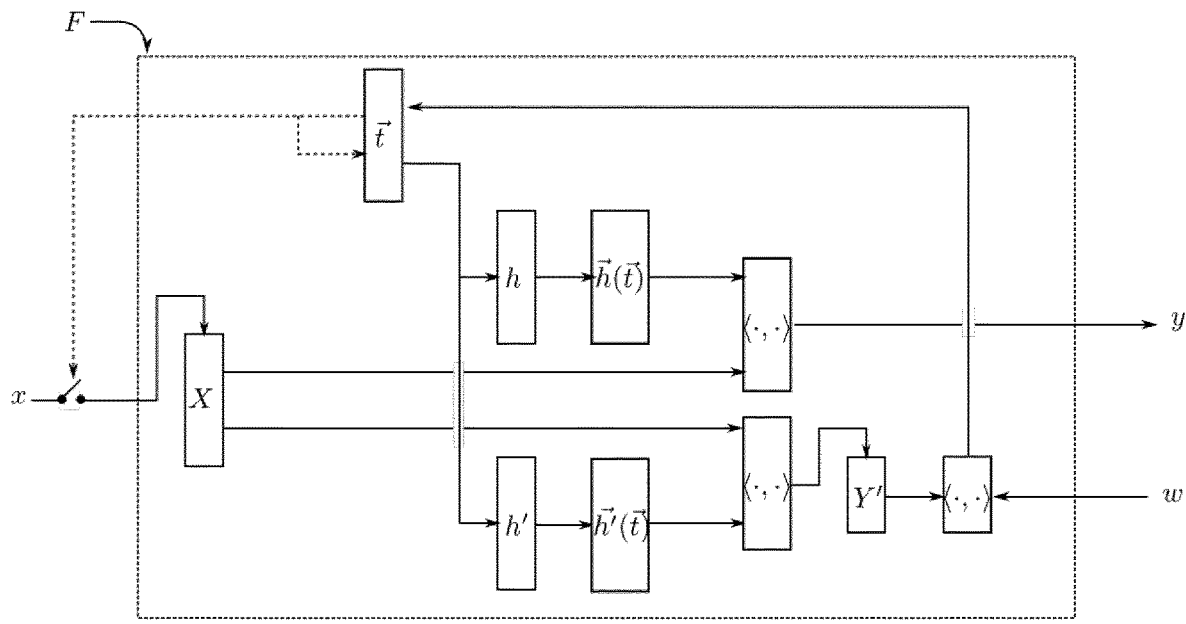

Other particular features and advantages of the present invention will emerge more clearly from the following description given in reference to the appended drawings, in which:

FIG. 1 schematically illustrates an adaptive synchronization device and its integration into a demodulation chain according to an embodiment of the invention;

FIG. 2 schematically illustrates the processings performed by a first synchronization module of the synchronization device according to an embodiment of the invention.

The same reference numerals can designate identical or similar elements in different figures.

DESCRIPTION OF PREFERRED EMBODIMENTS OF THE INVENTION

Hereinbelow, it will be clear that each module or sub-module of the synchronization device comprises at least one computing machine and software or code executable by the machine to define one or more parameters obtained by calculating one or more analytical functions specific to a module or sub-module. In this way, the processing of one or more functions can be implemented and performed by each module or sub-module. Implemented and performed mean either the execution of a program corresponding to the mathematical functions or formulae (specified in the text), by computer hardware (such as a microprocessor and a memory); or by hardware or a hardware and firmware combination.

The present invention relates to a synchronization device with decision feedback for performing demodulation of a signal emitted in linear modulation.

This synchronization device, as shown for example in FIG. 1, take as input a sampled signal (x), comprises at least one synchronization module (F) and a complementary correction module of transmission imperfections (H). This module (H) can be reduced to the identity function.

The synchronization module (F) comprises:

at least one first sub-module ($F_n$) arranged to deliver a first output signal (y) from the input signal (x) received at a period (T) less than the value $$\left(\frac{1}{B}\right)$$

with (B) the bandwidth of the input signal (x); this first sub-module ($F_n$) is capable of compensating a transmission delay of the input signal (x) by estimation of the propagation delay ($\tau$) between a transmitter and a receiver of a transmission medium;

at least one second sub-module ($F_u$) arranged to deliver a corrective ($\delta\tau$) to be applied to the current estimation of the delay ($\tau$), from an error term (w) defining the decision error of the device and the influence of the processings downstream of the first sub-module (F);

The complementary correction module (H) is disposed downstream of the synchronization module (F) and forms a correction chain of transmission imperfections of the first output signal (y) received by this module (H). This correction module comprises:

at least one first sub-module ($H_n$) arranged to deliver a second output signal (z) at the rhythm (T) estimating a stream of emitted symbols ($a_i$); ($H_n$) can be reduced to the identity;

at least one second sub-module ($H_p$) configured to deliver the error term (w), by application of a correction to an error term (v) for estimation of symbols to consider the influence of the processings included in the first sub-module ($H_n$); ($H_p$) can be reduced to the identity.

The module (H) can be configured to function at exactly one sample per symbol.

In some embodiments, the upstream input signal (x) of the synchronization module (F) is sampled at a speed greater than the bandwidth (B) of the signal, whereas the first output signal (y) is sampled at exactly one sample per symbol, such that the downstream processing chain functions at a reduced cadence of one sample per symbol.

In some embodiments, the error term (v) for estimation of symbols is obtained by performing a processor and software or an executable code implementing a subtraction operation between a signal (u) and the output signal (z) of the demodulator estimating with the current configuration of the demodulator this same stream of pilot symbols. This operation estimates the estimation error (v).

In some embodiments, according to the cooperative or non-cooperative telecommunication mode, the signal (u) comprises respectively either a suite of known learning sequence or a non-linear processing (NL) applicable to the second output signal (z) to obtain the signal (u).

In some embodiments, the input signal (x) responds to the following modelling:

$$x(t)=C\{\Sigma_{i=-\infty}^{+\infty} a_i h(t-iT-\tau)\}\eta(t) \text{ in which}$$

x(t) is a complex value of the input signal (x)
$a_i$ is a stream or a suite of emitted complex symbols h is a shaping filter of bandwidth (B)
T is the symbol rhythm; T and B verify $$\frac{1}{T} \leq B$$

$\tau$ is the propagation delay between the transmitter and the receiver
$\eta$ is a term of complex noise
C is a functional modelling the imperfections of the device (channel, dephasing, etc.) which are corrigible by the second synchronization module ($H_n$).

The shaping filter h and its derivative h' can be known and calculated. For example, the filter h can be a root raised cosine filter.

Hereinbelow. x is considered a version sampled at a rhythm greater than $$\frac{1}{B}$$

or x.

In some embodiments, the first sub-module ($F_n$) of the synchronization module (F) is configured by means of at least one processor and software or executable code to perform a function: next( ):$\emptyset \rightarrow$complex to define the first output signal (y).

The second sub-module ($F_u$) is configured to define a function: update(w):complex$\rightarrow \emptyset$ by means of at least one processor and software or executable code to estimate the corrective ($\delta\tau$).

The "next" function (term to define the returning of an element following an iterator) of the first sub-module ($F_n$) transforms the values of the input signal to return the next sample on request. The "update" function of the second sub module ($F_u$) updates the corrective to be applied to the estimation of the propagation delay of the signal (x) from estimation of the error (w).

In some embodiments, the first sub-module ($F_n$) of the synchronization module (F) comprises a generator configured to extract sample values from the input signal (x) t as needed. The signal (x) is then seen as a generator of samples, and can be iterated and used by the module (Fn).

In some embodiments, the sample values extracted from the input signal (x) are transmitted in a first buffer, disposed in the first sub-module of the synchronization module, so as to store the last values of the signal (x). The first buffer can be disposed in the first sub-module ($F_n$) or in the synchronization device outside the first sub-module ($F_n$), temporarily or permanently according to the preferred application.

In some embodiments, it further comprises a second buffer configured to store auxiliary variables useful for calculation of the corrective ($\delta\tau$). The second buffer can be disposed in the second sub-module ($F_u$) or in the synchronization device outside the second sub-module ($F_u$), temporarily or permanently according to the preferred application.

In some embodiments, the first and second buffers are a buffer memory of FIFO ("First-In-First-Out") type defining a method for organizing and handling a data buffer, in which the first data inputs are processed first).

In the following, a FIFO memory buffer can be considered as a vector. In this way, in some embodiments, the terms of the vector can range from the oldest (first vector index) to the most recent (last vector index) element of the FIFO buffer.

In this way, between two vectors $\vec{c}=^t(c_0, \ldots, c_{N-1})$ and $\vec{d}=^t(d_0, \ldots, d_{N-1})$, the scalar product operation is noted $$\langle \vec{c} | \vec{d} \rangle = \Sigma_i c_i \cdot d_i.$$

The real part of a number or a complex vector c is noted $\Re$ (c).

When $\vec{t}$ is a vector, the notation $\vec{h}(\vec{t})$ designates the vector of values of the function h evaluated on the values of the components of $\vec{t}$.

In some embodiments, the module further comprises an initialization function configured to initialize the parameters of the synchronization module (F).

On initiation, the synchronization module can assume the following parameters:

The values of sampling rhythm $T_{iq}$ and of symbol rhythm T, one of the latter can be fixed at 1 h and h' are functions for calculating the shaping filter of the signal and its derivative An initial value of $\tau \in [0, T[$; by default $\tau=0$ A real parameter $\mu \geq 0$ called learning speed and a priori small An integer n such that the time buffers described below have a size 2n+1 an integer m such that the error w is a complex vector of size m

The module (F) also has a reference noted "input" to the signal (x) which is seen as an iterative generator and has a next( ) function returning the next available sample.

In some embodiments, the synchronization device can be initialized by at least one processor and at least one software program or an executable code capable of performing the following initialization operations:

$\vec{t}$=initialize real number vector of size 2n+1 With $\vec{t}[i]=(i-n)\times Tiq+\tau$ $\vec{X}$=initialize complex number buffer FIFO of size 2n+1 to 0

$\vec{Y'}$=initialize complex number buffer FIFO of size m to 0

In which
the value $T_{iq}$ is the sampling rhythm
$\vec{t}$ is the corrected date vector to be reported to 0
i represents an evolutive variable
an initial value of $\tau \in [0, T[$
an integer n such that the buffers have a size 2n+1
an integer m such that the error (w) is a complex vector of size m In some embodiments, the synchronization module can be configured to perform the following processings by means of at least one processor and at least one software program or executable code:

next( ):Ø→complex $\vec{t}=\vec{t}+T$

While $\vec{t}(n)>0$
  x=input.next( )
  X.append(x)
  $\vec{t}=\vec{t}-T_{iq}$ $y=\langle \vec{X} | \vec{h}(\vec{t}) \rangle$ $y'=\langle \vec{X} | \vec{h'}(\vec{t}) \rangle$
Y'.append(y')
Return y
update(w):complex→Ø

$\delta\tau=2\mu \cdot \Re (\langle Y'|e \rangle)$ $\vec{t}=\vec{t}+\delta\tau$

The "while" loop allows to extract a set of samples (x) from the "input" generator and integrates them into the first memory buffer. The vector t contains the dates of samples contained in the buffer (X) or buffer relative to the date of the next symbol emitted by the module (Fn). As long as the sample date in the buffer middle is positive, a new sample is taken and the dates of the samples are updated until a negative date sample is extracted. Once the criterion is verified (i.e., a negative sample is extracted), the following processings to define the first output signal (y) can be continued.

In some embodiments, such as for example shown in FIG. 2, several processings are performed by at least one processor and software or executable code in the first sub-module ($F_n$) of the synchronization module (F) to be able to define a complex value y of the first output signal. The vector of the values of the function h evaluated on the values of the components of $\vec{t}$, noted $\vec{h}(\vec{t})$, and the complex values X, are integrated into a scalar product operation to define the complex value y of the first output signal (y). The vector of the values of the derivative function h' evaluated on the values of the components of $\vec{t}$, noted $\vec{h'}(\vec{t})$, and the complex values X, are integrated into another scalar product operation to define a complex value y' to be inserted into a buffer of FIFO Y' type. The vectorized version $\vec{Y'}$ of Y' and the error term (w), determined by the second module ($H_p$) of the downstream module (H) are integrated into a new scalar product operation to estimate a corrective ($\delta\tau$) to be applied to the dates contained in the vector $\vec{t}$. These different processing operations can be programmed in a loop to automate their applications in the generic chain. The different processings implemented via a processor and software or adapted executable code are easily performed and also rapidly estimate the synchronization parameter for blindly demodulating a telecommunications signal.

In some embodiments, it is configured to integrate with other modules intended to correct other defects of the transmission chain such as for example a correction phase module.

In some embodiments, the optimal parameter ($\tau$) is unknown on initialization of the system. The system then estimates this parameter on the fly.

In some embodiments, the optimal parameter ($\tau$) is known on initialization. The system continues the temporal variations of this parameter. These variations can for example be due to an error on the estimation of the period symbol.

The algorithm implementing these two tasks is identical, and only the learning speed parameter µ can be changed from one task to the other. In a real-time configuration, it is not necessary to switch the algorithm from one mode to the other.

In some embodiments, the synchronization module conjointly carries out filtering adapted to the filter h. The coefficients of the filter are evaluated on the dates of samples available in the buffer (X) to produce the interpolated value of the signal filtered by h at the time corrected by the propagation delay ($\tau$).

In some embodiments, the synchronization device of the present application allows to continue variation in the propagation delay ($\tau$) via a learning speed parameter µ adapted to the speed of variation of the expected parameter.

In some embodiments, the device allows to compensate an error on the knowledge of the symbol rhythm (T) by continuing the drift which such an error causes on the value of the delay ($\tau$).

In some embodiments, the synchronization module adapts the rate of the chain so that the sub-modules included in the correction module function at the symbol rhythm T; especially the synchronization module allows to sub-sample the signal of an arbitrary factor without loss of information. This configuration lets the synchronization device of the present invention function with a very high data rate at input of the synchronization module, while reducing downstream of said module, the cadence to one sample per symbol of the processing chain.

The present invention also relates to equipment for demodulating a signal in linear modulation via a transmission channel whether wired or free, comprising at least one adaptive synchronization device according to one of the embodiments of the present application.

In some embodiments, the synchronization module (F) is configured to adaptively compensate the propagation delay ($\tau$) on all of the input signals (x) received by the receiver equipment of the transmission network, and the second synchronization module (H) is configured to interface with the synchronization module (F), disposed upstream of the second synchronization module (H), so as to correct the transmission imperfections of the input signal (x) received and the decision error(s) of the device.

In some embodiments, the equipment comprises a device upstream of the input of the synchronization module (F) which samples at a speed greater than the inverse of the bandwidth (B) of the input signal (x).

In some embodiments, the demodulation equipment comprising the synchronization device of the present invention can be used in a context of blind or non-blind demodulation.

The present invention also relates to a method for demodulating a signal in linear modulation by an adaptive synchronization device with decision return according to one of the embodiments of the present invention. The method comprises the following steps:

Initialization of parameters of the synchronization modules by an initialization module comprising memory buffers;

Receipt of a flow of an input signal (x) of bandwidth (B) sampled at a rhythm $T_{iq}$ such as $$\frac{1}{T_{iq}} = B$$

by the first sub-module ($F_n$) of the synchronization module (F);

Delivery of a first output signal (y) sampled at a rhythm (T) equal to the time symbol of the signal (x);

Receipt of the first output signal (y) by additional processing modules ($H_n$); ($H_n$) can be reduced to the identity;

Delivery of a second output signal (z);

Estimation of the signal (u) of streams of symbols emitted by non-linear processing and from the second output signal (z);

Modification of the signal (z) by estimation of the signal (u) to deliver an error signal (v) for estimation of symbols;

Delivery of an error term (w) corrected by the second sub-module ($H_p$) from the error signal (v) for estimation of symbols;

Delivery of a corrective term ($\delta\tau$) by the second sub-module ($F_u$) from the error term (w);

Rectification and alignment of the propagation delay ($\tau$) by applying the corrective term ($\delta\tau$) to synchronize the input signal (x) with the first output signal (y) by cancelling transmission delay.

The method for demodulating a signal to a linear modulation of the present invention has the advantage of rapidly estimating on the fly and in real time the synchronization parameter and putting in place a correction adapted for each emitted signal. The present invention incorporates into a demodulation chain.

The present application describes various technical characteristics and advantages in reference to the figures and/or various embodiments. The skilled person will understand that technical characteristics of a given embodiment can in fact be combined with characteristics of another embodiment unless specified otherwise or it is evident that these characteristics are incompatible or the combination provides no solution to at least one of the technical problems mentioned in the present application. Also, the technical characteristics described in a given embodiment can be isolated from the other characteristics of this mode unless specified otherwise.

It must be evident for skilled persons that the present invention allows embodiments in many other specific forms without departing from the field of application of the invention as claimed. Consequently, the present embodiments must be considered by way of illustration but can be modified in the field defined by the scope of the appended claims, and the invention must not be limited to the details given hereinabove.

The invention claimed is:

1. An adaptive synchronization device for demodulating a signal in linear modulation, the adaptive synchronization device comprising:

at least one synchronization module (F) comprising:

at least one first sub-module ($F_n$) arranged to deliver a first output signal (y) from an input signal (x) received at a period (T) less than a value $$\left(\frac{1}{B}\right)$$

with (B) a bandwidth of the input signal (x), the at least one first sub-module ($F_n$) is capable of compensating a transmission delay of the input signal (x) by estimation of a propagation delay ($\tau$) between a transmitter and a receiver of a transmission medium;

at least one second sub-module ($F_u$) arranged to deliver an instant corrective ($\delta\tau$) to be applied to a current estimation of the propagation delay ($\tau$), from an error term (w) defining a decision error of the adaptive synchronization device and influence of processings downstream of the at least one first sub-module (F); and at least one correction module of transmission imperfections (H), disposed downstream of the at least one synchronization module (F) and forming a correction chain of transmission imperfections of the first output signal (y) received by the at least one correction module (H) at a rhythm (T), and comprising:

at least one first sub-module ($H_n$) arranged to deliver a second output signal (z) at the rhythm (T) estimating a stream of emitted symbols ($a_i$), the at least one first sub-module able to be reduced to an identity; the at least one first sub-module is configured to adapt a rate at an output of the at least one first sub-module to one sample per symbol; and at least one second sub-module ($H_p$) configured to deliver the error term (w) by application of a correction to an error term (v) for estimation of symbols to consider the influence of the processings included in the at least one first sub-module ($H_n$), the at least one second sub-module able to be reduced to the identity.

2. The adaptive synchronization device according to claim 1, wherein the error term (v) for estimation of symbols is obtained by performing a processor and software or an executable code implementing a subtraction operation between a signal (u) at the rhythm (T) estimating trains of the emitted symbols ($a_i$) and the second output signal (z).

3. The adaptive synchronization device according to claim 2, wherein in a cooperative telecommunication mode, the signal (u) is a suite of known learning sequence, whereas in a non-cooperative telecommunication mode, a non-linear processing (NL) is applied to the second output signal (z) to obtain the signal (u).

4. The adaptive synchronization device according to claim 1, wherein the input signal (x) sampled by the adaptive synchronization device verifies a model, the model being:

$$x(t) = C\left\{\sum_{i=-\infty}^{+\infty} a_i h(t - iT - \tau)\right\} + \eta(t)$$

in which
x(t) is a complex value of the input signal (x),
$a_i$ is a stream or a suite of emitted complex symbols,
h is a shaping filter of bandwidth (B),
T is a symbol rhythm; T and B verify $$\frac{1}{T} \leq B$$

τ is the propagation delay between the transmitter and the receiver,
η is a term of complex noise,
C is a functional modeling the transmission imperfections of the adaptive synchronization device which are corrigible by the at least one correction module (H).

5. The adaptive synchronization device according to claim 1, wherein the at least one the first sub-module ($F_n$) of the at least one synchronization module (F) is configured to perform a function: next( ):∅→complex by at least one processor and software or executable code, to define the first output signal (y); and the at least one second sub-module ($F_u$) is configured to define a function: update(w):complex→∅ by at least one processor and software or executable code, to define the instant corrective (δτ).

6. The adaptive synchronization device according to claim 1, wherein the at least one first sub-module ($F_n$) of the at least one synchronization module (F) comprises a generator configured to extract sample values from the input signal (x).

7. The adaptive synchronization device according to claim 6, wherein the sample values extracted from the input signal (x) are transmitted in a first buffer, disposed in the at least one first sub-module of the at least one synchronization module, so as to store last values of the input signal (x).

8. The adaptive synchronization device according to claim 7, wherein the adaptive synchronization device further comprises a second buffer configured to store auxiliary variables for later calculating the instant corrective (δτ) to be applied to dates of samples contained in the first buffer.

9. The adaptive synchronization device according to claim 7, wherein the first buffer is a buffer memory comprising a FIFO type buffer.

10. The device according to claim 1, wherein the adaptive synchronization device further comprises an initiation module configured to initialize parameters of the at least one synchronization module (F).

11. The adaptive synchronization device according to claim 10, wherein the synchronization device is initialized by initialization operations comprising:

$\vec{t}$=initialize real number vector of size 2n+1 with
$\vec{t}$[i]=(i−n)×Tiq +τ

$\vec{X}$=initialize complex number buffer FIFO of size 2n+1 to 0

$\vec{Y'}$=initialize complex number buffer FIFO of size m to 0 in which
value $T_{i_q}$ is a sampling rhythm,
$\vec{t}$ is a corrected date vector to be reported to 0,
an initial value of τ∈[0, T[,
an integer n such that buffers have a size 2n+1,
an integer m such that the error term (w) is a complex vector of size m.

12. The adaptive synchronization device according to claim 11, wherein the adaptive synchronization device is configured to perform processings by at least one processor and software or an executable code, the processings comprising:

next( ):∅→complex
$\vec{t}=\vec{t}+T$
While $\vec{t}(n)>0$
  x=input.next( )
  X.append(x)
  $\vec{t}=\vec{t}-T_{i_q}$
y=⟨$\vec{X}|\vec{h}(\vec{t})$⟩
y'=⟨$\vec{X}|\vec{h'}(\vec{t})$⟩
Y'.append(y')
Return y
update(w):complex→∅
δτ=2μ·ℜ(⟨Y'|e⟩)
$\vec{t}=\vec{t}+δτ$ in which
the values $T_{i_q}$ and T are respectively the sampling rhythm and the rhythm which comprises a symbol rhythm,
h and h' are functions for calculating respectively a shaping filter of the signal and its derivative,
μ≥0 is a real positive or zero parameter called learning speed.

13. The adaptive synchronization device according to claim 9, wherein the FIFO type buffer is reinterpreted as a vector whereof terms of the buffer range from oldest (first index of the vector) to most recent (last index of the vector) element of the buffer.

14. The adaptive synchronization device according to claim 1, wherein the adaptive synchronization device is configured to integrate with other modules intended to correct other defects of the correct chain of transmission imperfections.

15. Equipment for demodulating a signal to a linear modulation, comprising:
at least one adaptive synchronization device, the at least one adaptive synchronization device comprising at least one synchronization module (F) comprising:
at least one first sub-module ($F_n$) arranged to deliver a first output signal (y) from an input signal (x) received at a period (T) less than a value $$\left(\frac{1}{B}\right)$$

with (B) a bandwidth of the input signal (x), the at least one first sub-module ($F_n$) is capable of compensating a transmission delay of the input signal (x) by estimation of a propagation delay ($\tau$) between a transmitter and a receiver of a transmission medium;

at least one second sub-module ($F_u$) arranged to deliver an instant corrective (67 $\tau$) to be applied to a current estimation of the propagation delay ($\tau$), from an error term (w) defining a decision error of the adaptive synchronization device and influence of processings downstream of the at least one first sub-module (F); and at least one correction module of transmission imperfections (H), disposed downstream of the at least one synchronization module (F) and forming a correction chain of transmission imperfections of the first output signal (y) received by the at least one correction module (H) at a rhythm (T), and comprising:

at least one first sub-module (He) arranged to deliver a second output signal (z) at the rhythm (T) estimating a stream of emitted symbols (a), the at least one first sub-module able to be reduced to an identity; the at least one first sub-module is configured to adapt a rate at an output of the at least one first sub-module to one sample per symbol; and at least one second sub-module ($H_p$) configured to deliver the error term (w) by application of a correction to an error term (v) for estimation of symbols to consider the influence of the processings included in the at least one first sub-module ($H_n$), the at least one second sub-module able to be reduced to the identity;

wherein the at leat one synchronization module (F) is configured to adaptively compensate the propagation delay ($\tau$) on all of the input signal (x) received by the receiver, and the at least one correction module (H) is configured to interface with the at least one synchronization module (F), disposed upstream of the at least one correction module (H).

16. The equipment according to claim 15, wherein a device upstream of an input of the at least one synchronization module (F) samples at a speed greater than an inverse of the bandwidth (B) of the input signal (x).

17. An adaptive synchronization method for demodulating a signal in linear modulation by an adaptive synchronization device with decision return, wherein the adaptive synchronization device comprises at least one synchronization module (F) comprising:
at least one first sub-module ($F_n$) arranged to deliver a first output signal (y) from an input signal (x) received at a period (T) less than a value $$\left(\frac{1}{B}\right)$$

with (B) a bandwidth of the input signal (x), the at least one first sub-module ($F_n$) is capable of compensating a transmission delay of the input signal (x) by estimation of a propagation delay (r) between a transmitter and a receiver of a transmission medium;

at least one second sub-module (F") arranged to deliver an instant corrective (Sr) to be applied to a current estimation of the propagation delay ($\tau$), from an error term (w) defining a decision error of the adaptive synchronization device and influence of processings downstream of the at least one first sub-module (F); and at least one correction module of transmission imperfections (H), disposed downstream of the at least one synchronization module (F) and forming a correction chain of transmission imperfections of the first output signal (y) received by the at least one correction module (H) at a rhythm (T), and comprising:

at least one first sub-module ($H_n$) arranged to deliver a second output signal (z) at the rhythm (T) estimating a stream of emitted symbols ($a_i$), the at least one first sub-module able to be reduced to an identity; the at least one first sub-module is configured to adapt a rate at an output of the at least one first sub-module to one sample per symbol; and at least one second sub-module ($H_p$) configured to deliver the error term (w) by application of a correction to an error term (v) for estimation of symbols to consider the influence of the processings included in the at least one first sub-module ($H_n$), the at least one second sub-module able to be reduced to the identity;

wherein the method comprises:

initializing parameters of synchronization modules by an initialization module comprising memory buffers;

receiving a flow of an input signal (x) by the at least one first sub-module ($F_n$) of the at least one first synchronization module (F);

delivering a first output signal (y) sampled at the rhythm which comprises a symbol rhythm and with a corrected delay;

receiving the first output signal (y) by the at least one first sub-module ($H_n$) of the at least one correction module (H);

delivering a second output signal (z);

estimating the signal (u) of streams of symbols emitted by non-linear processing and from the second output signal (z);

modifying the signal (z) by the estimation of the signal (u) to deliver an error signal (v) for estimation of symbols;

delivering an error term (w) corrected by the at least one correction module (H) from the error signal (v) for estimation of symbols;

delivering a corrective term ($\delta\tau$) by the at least one second sub-module ($F_u$) from the error term (w);

rectifying and aligning the propagation delay ($\tau$) by applying the corrective term ($\delta\tau$) to synchronize the input signal (x) with the first output signal (y) by cancelling transmission delay.

18. The adaptive synchronizaiton device according to claim 8, wherein the second buffer is a buffer memory comprising a FIFO type buffer.

* * * * *